May 29, 1923.
W. F. WEDEMEYER
AUTOMOBILE SIGNAL
Filed Jan. 8, 1921
1,457,200
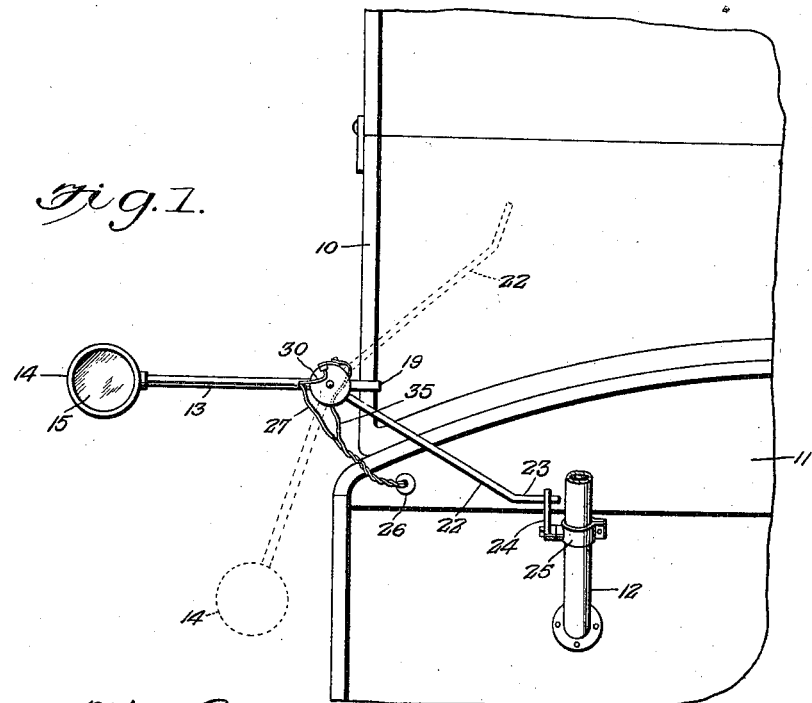
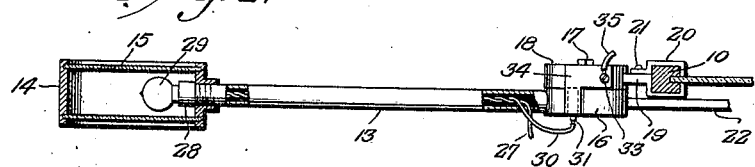
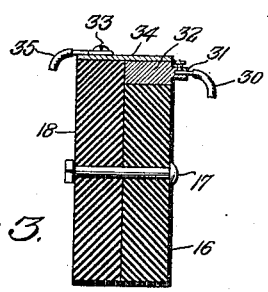
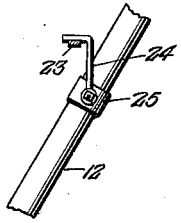
Inventor
W. F. Wedemeyer;
By Geo. P. Kimmel, Attorney Patented May 29, 1923.

1,457,200

UNITED STATES PATENT OFFICE.

WILLIAM F. WEDEMEYER, OF SHEBOYGAN, WISCONSIN.

AUTOMOBILE SIGNAL.

Application filed January 8, 1921. Serial No. 435,860.

*To all whom it may concern:*

Be it known that I, WILLIAM F. WEDEMEYER, a citizen of the United States, residing at Sheboygan, in the county of Sheboygan and State of Wisconsin, have invented certain new and useful Improvements in an Automobile Signal, of which the following is a specification.

The invention relates to an improvement in automobile signals, and more particularly to a type of the same adapted for use at the side of an automobile for indicating directions of movement thereof, when in motion, or for use as a parking light, when the same is left standing unattended, whereby to eliminate the use of the tail and head lights of the automobile.

The primary object of the invention is to provide for a signal of the type mentioned, and one of an extremely simplified and inexpensive construction, but which is extremely efficient and effective for the desired purposes thereof.

A further object of the invention is to provide a signal of the character mentioned, and one which is easily and quickly attachable to the wind-shield of an automobile, and readily operable from the driver's position at the steering wheel without attracting the attention of the driver of the car unduly from his control and manipulation of the latter.

Another object of the invention is to provide a signal characterized by an operating means admitting of the actuation of the signal to indicate contemplated turning movement of the automobile, when the latter is of the permanently closed type, or when the open types of the same are closed by storm curtains.

A still further object of the invention is to provide a signal of the type set forth, and one embodying an electric lamp to be lighted from the source of current supply of the automobile through the medium of a switching device which operates to close and open the circuit to the lamp automatically with the movement of the signal to and from operative position.

With the foregoing objects in view, the invention resides in the certain novel and useful construction and arrangement of parts as will be hereinafter more fully described, set forth in the appended claims, and illustrated in the accompanying drawings, in which:—

Figure 1 is a fragmentary elevation of the dash and windshield of an automobile and showing the invention applied thereto.

Fig. 2 is a partial longitudinal section of the signal and the adjacent portion of the wind-shield, Fig. 3 is an enlarged transverse sectional detail of the switching device, and Fig. 4 is a fragmentary section of the steering post of the automobile showing the latch device thereon for holding the signal in operative position.

Referring to the drawing, the numeral 10 indicates the lower section of the wind-shield rising from the dash portion 11 of an automobile, and 12 the lower portion of the steering post thereof, all of usual construction, and not forming any part of the present invention.

A signal arm 13, preferably of tubular construction, has threaded on its outer end a casing 14, of circular form, and open at its opposite ends, which ends are closed in any suitable manner, or as shown, by means of glass strips 15, preferably red in color. The inner end of the arm 13 is suitably secured to or threaded in a circular block 16, of an insulating material, which is mounted for rotation on a pintle or bolt 17 carried in a second circular block 18, the latter being also of an insulating material. The block 18 is held against rotation by means of a fixed clamping member 19, which has its free end shaped to engage around the frame of the automobile wind-shield to which it is clamped. A correspondingly shaped clamping member 20 engages the opposite side of the frame of the wind-shield and is secured to the fixed clamping member 19 by a fastening 21. The rotatable block 16 is provided with a radially extending operating lever or arm 22 which projects inwardly of the side of the automobile in rear of the wind-shield 10 and has its inner end bent at an angle, as at 23, for convenience in its manipulation, and to facilitate its engagement with a substantially inverted L-shaped latch member 24, the latter being clamped, as at 25, to the steering post 12, and engaging the lever when the signal is swung to operative or raised position.

Electrical current is tapped from a suitable socket 26, or in any other desired manner having connection with the current supply from the automobile, and a conductor 27 therefrom leads to the inner end of the arm 13, passes through the arm, and connects the base 28 and the lamp 29 within the casing 14. A return conductor 30 leads through the arm 13, from the lamp base 28, and connects a binding post 31 projecting from a facial or peripheral contact element 32 carried on the rotatable block 16.

The fixed block 18 is provided with a binding screw 33, for retaining in place on its periphery, a contact plate 34 which projects across and contacts with the periphery of the rotatable block 16, and completes the circuit to the lamp base 28, when the facial contact 32, of the block 16, is brought in position under the same. Connecting the screw 33 is a conductor 35 which leads to the plug 26. The contacts 32 and 34 are disposed on the respective blocks 16 and 18, so that the circuit is broken thereby, when the arm 13 is swung downwardly to inoperative position, and completes the circuit to the lamp 29, when the arm has reached approximately a half way position, and maintains the completed circuit thence to full operative position of the arm 13, which is outwardly at right angles to the vertical sides of the wind-shield 10.

In the use of this signal, the pivotal arrangement of the same admits of the arm 13 lying close into the side of the body, with the operating lever 22 raised to a convenient position in front of the operator. When it is desired to make a turn or a stop with the automobile, the signal may be used instead of the hand method of signalling, and the portion 23 of the lever 22 is grasped and pushed downwardly, the angular portion 23 being engaged under the free end of the L-shaped bracket 24, if it is desired to retain the signal in operative or raised position. In swinging the arm 13 upwardly and outwardly, the contact 32 wipes under the contact 34 and closes the circuit of the lamp 39, which remains lighted until the arm 13 is again lowered. When the car is parked, or stationary, the signal may be moved to operative position so as to act as a "parking" light or signal.

It is to be understood that, while I have described and shown the invention as applied to a normally open type of automobile, and arranged thereon to operate as readily with the body thereof enclosed by storm curtains as when the latter are not in use, various changes in the detailed construction and arrangement of the parts of the signal may be resorted to and changes in the location of the same on the dash or windshield made for admitting of the use of the same on any and all of the known types of permanently closed, semi-open and fully open automobiles, vehicles and the like, without departing from the spirit and scope thereof.

Having thus fully described the invention, what is claimed, is:—

1. An automobile signal comprising a stationary support adapted to be fixed to one side of an automobile, a rotatable element connected to said support, a signal arm carried by said rotatable element, a rearwardly inclined hand lever projecting inwardly from said rotatable support and formed with an angle shaped inner end, and an angle shaped latch device adapted to be carried by the steering column of an automobile and engageable with said angle shaped inner end of said lever for retaining said signal arm in its operative position.

2. In an automobile signal, a stationary support adapted to be fixed to and project outwardly from one side of an automobile, a rotatable element carried by the outer end of said support, a signal arm projecting outwardly from said rotatable element, a lever arm projecting inwardly from said rotatable support and permanently disposed at an angle with respect to said signal arm, said lever having its inner terminal portion disposed at an angle with respect to the remaining portion of said lever, and an inverted L-shaped latch adapted to be secured to the steering column of an automobile and engaged by said annular inner terminal of the lever for retaining the signal arm in operative position.

3. An automobile signal comprising a lateral support adapted to be fixed to one side of an automobile, a shiftable support connected to said lateral support, an outwardly projecting signal arm carried by said shiftable support, an inwardly extending lever carried by the shiftable support and permanently disposed at an inclination with respect to said signal arm, said lever having its inner terminal portion disposed at an angle with respect to the remaining portion thereof, and means adapted to be secured to the steering column of an automobile and engaged by the inner terminal portion of said lever for maintaining the signal arm in operative position.

In testimony whereof, I affix my signature hereto.

WILLIAM F. WEDEMEYER.